May 23, 1944. A. S. HOWELL 2,349,500
ROTATABLE SHUTTER FOR MOTION PICTURE PROJECTORS
Filed July 16, 1942
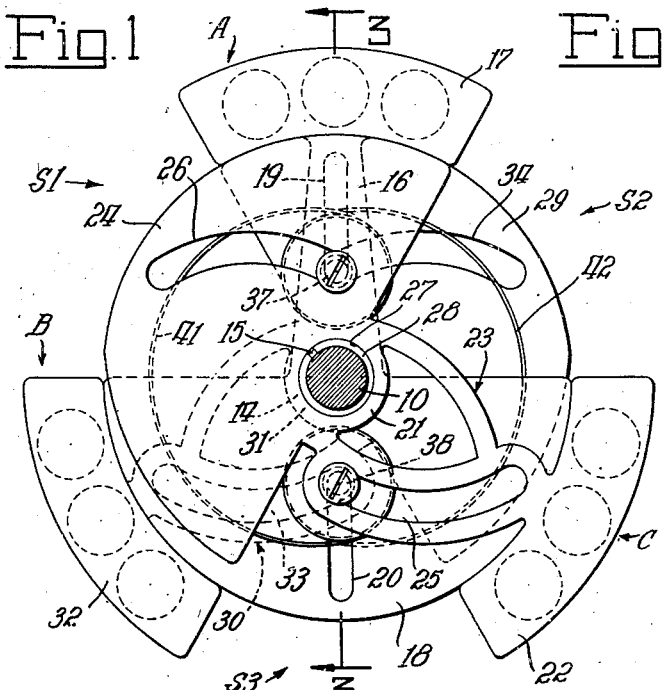
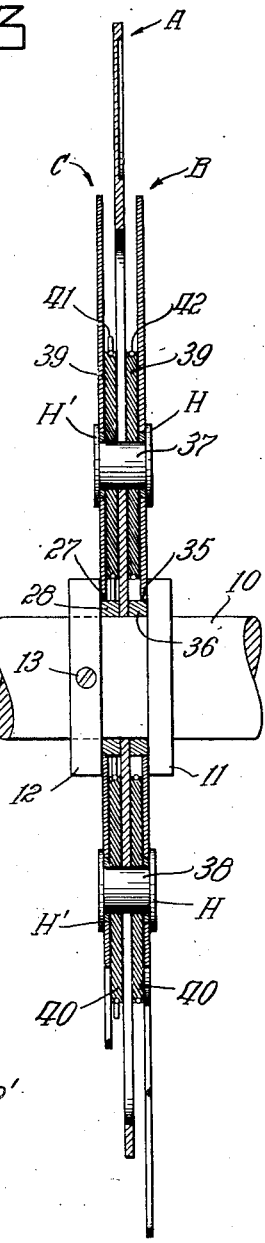
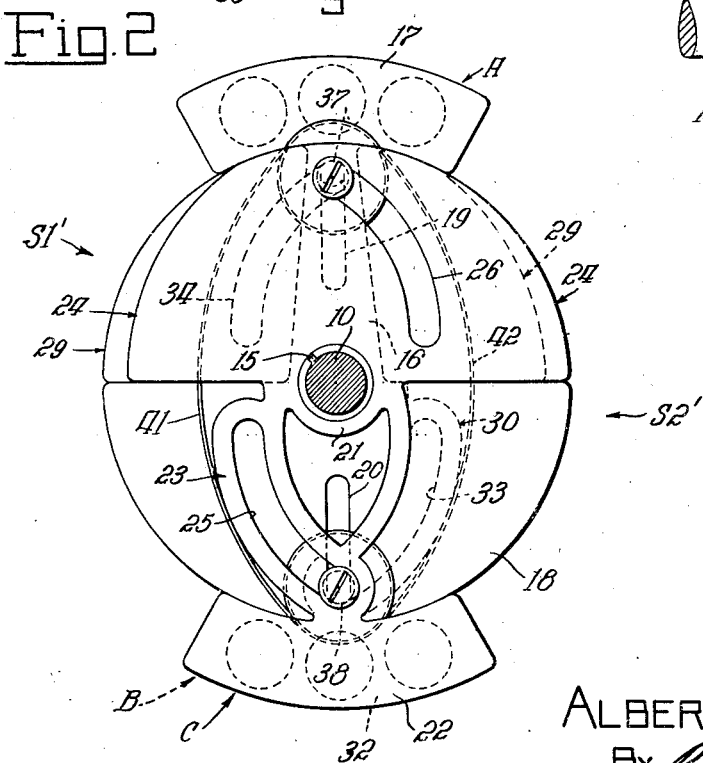
INVENTOR
ALBERT S HOWELL
ATTY.

Patented May 23, 1944

2,349,500

UNITED STATES PATENT OFFICE 2,349,500

ROTATABLE SHUTTER FOR MOTION PICTURE PROJECTORS

Albert S. Howell, Culver, Ind., assignor to The Bell & Howell Company, Chicago, Ill., a corporation of Illinois Application July 16, 1942, Serial No. 451,121

3 Claims. (Cl. 88—19.4)

My invention has to do with a rotatable shutter structure for use in motion picture projectors, and relates more particularly to such a structure having light shields between which projector light beam passing portions are defined and which are adjustable to change the number of said portions wherefore the frequency of light impulses traversing the light passing portions can be caused to be the same after a change in shutter speed as before, which structure is extremely simple in design, inexpensively produced and entirely satisfactory in its operation.

A further object of this invention is the provision of a shutter srtucture as the above together with a novel speed-responsive means operable upon attainment of a certain speed increment to cause adjustment of the light shields into the positions in which they incur substantially the same frequency for said light impulses as obtains at a certain lower speed prior to such light shield adjustment.

In the drawing:

Fig. 1 is an end elevational view of a shutter structure embodying the principles of the present invention, the light shield members thereof being illustrated in their spread formation;

Fig. 2 is a view like Fig. 1 but showing the light shield members in a different formation wherein a pair of them are in feathered relation; and Fig. 3 is a sectional view taken axially through the device upon the line 3—3 of Fig. 1.

The present structure, as shown in each of Figs. 1, 2 and 3, is mounted upon a rotatable operating shaft 10. Said structure is mounted for rotation with the shaft 10 and upon which it is held against axial displacement by a flange 11 and a collar 12 held in place upon the shaft by a setscrew 13; see Fig. 3. There are three light shield members generally designated A, B and C, all of which consist of sheet metal stampings. The light shield member A serves as a frame for the rest of the structure and may be referred to as the master shield member inasmuch as it is rotatively fixed with respect to the shaft 10, whereas the members B and C are mounted for rotative adjustment relatively to and coaxially with said shaft.

The master light shield member A has a hub portion 14 fixed non-rotatively upon the shaft 10 by a key 15, Fig. 2. From said hub portion there extends an arm 16 upon which light shield means in the form of an arcuate tab 17 is disposed. There also depends from the hub 14 a segmental counterweight portion 18. Radial and diametrically opposite slots 19 and 20 are formed respectively in the arm 16 and the counterweight portion 18.

The light shield members B and C are shaped generally like the light shield member A. Members B and C are identical in shape but are turned to present opposite faces to the front as viewed in Figs. 1 and 2. The member C which is in front in Figs. 1 and 2 is there readily seen to have a hub portion 21 from which there is depended tab-like light shield means 22 at the end of a cutout arm structure 23. A counterweight portion 24 of the light shield member C and which is of segmental shape is positioned in substantial diametric opposite relation with respect to the arm 23 and the light shield means 22. An arcuate slot 25 is formed in the arm 23 whereas a similar slot 26 is formed in the counterweight portion 24 in symmetrical relation with respect to the slot 25 with respect to the hub 21. A bearing opening 27, Fig. 3, within the hub 21 is journalled upon a bearing ring 28 which is rotatively fixed upon the shaft 10 by means of the key 15.

A segmental counterweight part 29 of the shield member B corresponds to the counterweight part 24 of the member C, and likewise a cutout arm 30, a hub 31 and a light shield means in the form of a tab 32 correspond respectively to the parts 23, 21 and 22 of the light shield member C. Arcuate camming slots 33 and 34 in the light shield member B respectively correspond to the slots 25 and 26 in the member C. A bearing opening 35 in the hub 31 is journalled upon a bearing ring 36, Fig. 3, which is also rotatively fixed upon the shaft 10 by the key 15.

Said rings 28 and 36 together with the hub portion of the master light shield member A further serve as spacing means between the flange 11 and the collar 12 to insure sufficient spaced relation between said flange and said collar as to prevent their binding the members B and C, thus leaving the members B and C freely rotatable.

When the light shield members are in the spread formation illustrated in Fig. 1 one end of each of the slots 19, 26 and 34 respectively in the members A, C and B are in alignment axially of the structure. Also it will be noted that one end of each of the slots 20, 25 and 33 are in alignment axially of the structure. This alignment of said slots facilitates the insertion therein of pin-like cam follower members 37 and 38. These members are inserted into their respectively associated slots from the back to place their heads H adjacently to the back side of the light shield member B and to present their forward ends, which are axially drilled and tapped, at the forward face of the light shield member C for receiving screws having flat heads H' of substantially the same diameter as the heads H. The cam follower 37 also passes through disk-like centrifugal weights 39 upon respective sides of the light shield member A, and the cam follower 38 likewise extends through disk-like centrifugal weights 40. A pair of C-shaped springs 41 and 42 are employed for yieldingly urging the centrifugal weights 39 and 40 radially inwardly of the guide slots 19 and 20, that is, into the position shown in Fig. 1. The ends of the C-shaped springs 41 and 42 lie within grooved peripheral edges of the centrifugal weights, as illustrated in Fig. 3.

During the operation of a motion picture projector upon which the present structure is installed the operating shaft 10 rotates to cause rotation of the shutter structure unitarily therewith. The well-known light aperture (not shown) in the projector registers with a circumferential zone of the shutter structure within which the shield means 17, 22 and 32 are disposed as well as the light passing portions defined between said light shield means radially adjacently to the outer peripheries of the counterbalancing portions 18, 28 and 29. These light passing portions, in the present instance, are arcuate spaces respectively designated S1, S2 and S3 in Fig. 1 and S1' and S2' in Fig. 2.

It is conventional practice to rotate a motion picture projector shutter at a speed causing the projection of 48 impulses per second therethrough. Therefore, with the operating shaft 10 rotating at 16 revolutions per second, and with the shutter structure in the position of adjustment shown in Fig. 1, since there are three light passing portions S1, S2 and S3, there would be 48 impulses per second. Practice has proven that projectors operating at the 48 impulse frequency are satisfactory and desirable.

I have so designed the present structure that the 48 impulse frequency will be incurred at two different rates of speed of the drive shaft 10, whereby the character of projection will be of the nature of that employed in standard practice at each of such operating speeds, and this has been attained in such a manner that the operating characteristics of the shutter within the speed range between said speeds is satisfactory. In Fig. 2 the shield members B and C have been rotated respectively counter-clockwise and clockwise from the spread position shown in Fig. 1 to a full feathered position in which they register axially of the apparatus. In this manner the shield means 22 and 32 are caused to overlie the light passing portion S3 and to correspondingly increase the arcuate extent of the light passing portions S1 and S2 to result in the light passing portions S1' and S2'. This full feathering relation of the light shield means 22 and 32 is obtained by speed-responsive apparatus including the centrifugal or inertia weights 39 and 40, the springs 41 and 42 and the cam followers 37 and 38 which slide in their respectively associated slots in the shield members A, B and C. As the speed of the shaft 10 increases above 16 revolutions per second the inertia weights 39 and 40 will be thrown outwardly causing the cam followers 37 and 38 to move radially outwardly in the guide slots 19 and 20 while camming along their respectively associated slots 25 and 26 in the light shield member C and slots 33 and 34 in the light shield member B, causing the member C to pivot clockwise and the member B to pivot counter-clockwise. The mass of the weights 39 and 40 is so chosen with respect to the strength of the C-springs 41 and 42 that upon the shaft 10 attaining a speed of 24 revolutions per second the cam followers 37 and 38 will be at the outer limits of their guide slots 19 and 20 as well as at the opposite ends (the ends shown in Fig. 2) of the cam slots 33 and 34 and 25 and 26 in the shield members B and C. When this position of adjustment obtains, the circumferential extent of the shield means 22 and 32 will be equal to that of the shield means 17 and said parts 22 and 32 will be diametrically opposite with respect to the part 17. Since in this position there will be but two light passing portions S1' and S2' and 24 revolution per second speed of the drive shaft will result in a light impulse frequency of 48 revolutions per second.

During the transition from the 16 revolution per second speed to the 24 revolution per second speed no harmful effects will result in the quality of projection since the amount of light transmitted through the light passing portions will never be decreased. That is, while the light shield means 32 and 22 are at an intermediate point of adjustment, say in a position in which the light passing portion S3 has one-half the arcuate extent as that shown in Fig. 1, the light passing portions S1 and S2 will be proportionately increased. In fact, after the edges of the light shield means 22 and 32, shown opposed in Fig. 1, have met, and upon further increase in speed for increasing the feathered relation of the parts 22 and 32, the area of the light passing portions S1 and S2 increases to exceed the total area of the light passing portions S1, S2 and S3 with the mechanism in the adjustment illustrated in Fig. 1. As a consequence, with the apparatus operating at the higher speed, that is, at the 24 revolutions per second speed, the efficiency of the projector, with respect to the illumination of the screen onto which the beam is projected, will be greater.

My improved structure has further advantages from the standpoint of its manufacture. It is of special note that the parts are primarily economically produced stampings, and these are adapted to be held in assembly by and to cooperate with other parts which are inexpensive and easily fabricated into the finished whole. The structure is also light in weight, compact and easily balanced.

While I have thus described my invention, I do not wish to be limited to the precise details described, as changes may be readily made without departing from the spirit of my invention, but having thus described my invention, I claim as new and desire to secure by Letters Patent the following:

1. In a rotatable shutter structure, a rotatably mounted frame member provided with a light shield portion spaced radially from the rotational axis of said structure, a pair of light shield members associated with said frame member for pivotal adjustment about said rotational axis and each provided with a light shield portion of an angular extent substantially equal to that of the frame light shield portion and spaced radially from said rotational axis equidistantly with the frame light shield portion and being disposed relative to each other to facilitate pivotal adjustment of the adjustable shield members from a spread formation wherein all of said shield portions are distributed substantially equiangularly with reference to said rotational axis to provide three light passing portions of substantially equal angular extent disposed substantially equiangularly with reference to said rotational axis and into overlapping relation within a common position diametrically opposite with respect to the frame shield portion to provide two light passing portions of substantially equal angular extent disposed substantially equiangularly with reference to said rotational axis, and speed responsive means sensitive to the rotational speed of said structure and operable to position said adjustable shield members in said spread formation and in said overlapping relation respectively at a slow and a high rotational speed of said structure.

2. In a rotatable shutter structure, a rotatably mounted frame member having a pair of guide slots directed radially and arranged diametrically opposite with respect to the rotational axis of said structure, light shield means on said frame member spaced radially from said rotational axis, a pair of light shield members associated with said frame for pivotal adjustment about said rotational axis, each of said pivotally adjustable shield members having cam slots therein of which portions are in respective registry with said guide slots, said pivotally adjustable shield members having light shield means thereon spaced radially from said rotational axis equidistantly with the frame light shield means and being in different planes axially of said structure to facilitate pivotal adjustment of the adjustable shield members from a spread formation wherein all of said shield means are distributed substantially equiangularly with reference to said rotational axis into overlapping relation within a common position diametrically opposite with respect to the shield means on the frame member, cam followers in said guide slots and disposed within said cam slots respectively associated therewith, means yieldingly urging said cam followers radially inwardly within the guide slots into an inner position wherein said followers are cooperative with the cam slots to retain the adjustable shield means in position to produce the aforesaid spread formation of said shield means, and inertia weight means associated with said cam followers for moving the same to an outer radial limit in the guide slots against the force of said yieldingly urging means upon attainment of a predetermined rotative speed by said structure, and said cam slots being of a contour for said cam followers, in moving to said outer radial limit, to impart opposite directions of rotation to said pivotal shield members to carry the shield means thereon into the aforesaid overlapping relation.

3. In a rotatable shutter structure, a rotatably mounted frame plate arranged perpendicularly to the rotational axis of said structure and having a pair of guide slots directed radially and arranged diametrically opposite with respect to said axis, light shield means spaced radially from said axis on said plate, a pair of light shield plates upon opposite sides of said frame plate in closely spaced flatwise relation therewith, said light shield plates each having a pair of cam slots therein respectively having portions in registry with portions of the guide slots, said light shield plates also having light shield means thereon spaced radially from said axis equidistantly with the frame plate light shield means, said light shield plates being pivotally adjustable from a spread formation wherein the shield means are distributed substantially equiangularly about said axis into another formation wherein the light shield means on the adjustable plates are in overlapping relation within a common radial position diametrically opposite with respect to the light shield means on the frame plate, cam followers in said guide slots and disposed within said cam slots respectively associated therewith, means yieldingly urging said cam followers radially inwardly within the guide slots into an inner position wherein said followers are cooperative with the cam slots to retain the adjustable shield plates in position to produce the aforesaid spread formation of said shield means, and inertia weight means comprising counterparts upon each cam follower and with the counterparts of each follower upon opposite sides of the frame plate, said inertia weights being operable by virtue of their centrifugal force for moving said followers to an outer radial limit in the guide slots against the force of said yieldingly urging means upon attainment of a predetermined rotative speed by said structure, and said cam slots being of a contour for said cam followers, in moving to said outer radial limit, to impart opposite directions of rotation to said pivotal shield plates to carry the shield means thereon into the aforesaid overlapping relation.

ALBERT S. HOWELL.